(12) United States Patent
Fox et al.

(10) Patent No.: US 8,657,238 B2
(45) Date of Patent: Feb. 25, 2014

(54) RETRACTABLE VORTEX GENERATOR FOR REDUCING STALL SPEED

(75) Inventors: Bruce R. Fox, Everett, WA (US); Stephen J. Fox, Everett, WA (US)

(73) Assignee: The Boeing Company, Chicago, IL (US)

( * ) Notice: Subject to any disclaimer, the term of this patent is extended or adjusted under 35 U.S.C. 154(b) by 131 days.

(21) Appl. No.: 13/176,539

(22) Filed: Jul. 5, 2011

(65) Prior Publication Data

US 2013/0009016 A1 Jan. 10, 2013

(51) Int. Cl.
*B64C 21/00* (2006.01)

(52) U.S. Cl.
USPC .................... 244/204.1; 244/199.1; 244/213; 244/214; 244/215; 244/219

(58) Field of Classification Search
USPC ................ 244/199.1, 200.1, 201, 204, 204.1, 244/213–215, 219
See application file for complete search history.

(56) References Cited

U.S. PATENT DOCUMENTS

| 3,263,945 A | 8/1966 | Wimpenny |
| 4,039,161 A * | 8/1977 | Bauer ........................... 244/213 |
| 5,253,828 A | 10/1993 | Cox |

OTHER PUBLICATIONS

EP12172660—Combined Search and Examination Report, Oct. 5, 2012.

* cited by examiner

*Primary Examiner* — Timothy D Collins
*Assistant Examiner* — Nicholas McFall
(74) *Attorney, Agent, or Firm* — Ameh IP; Elahe Toosi; Lowell Campbell

(57) ABSTRACT

A device and methods for low speed performance improvement of a lifting surface assembly are disclosed. At least one vortex generator is coupled to the lifting surface assembly, and the vortex generator is extended through the lifting surface assembly by drooping a hinged leading coupled to the lifting surface assembly to increase lift. The vortex generator is retracted inside the lifting surface assembly to decrease drag.

20 Claims, 7 Drawing Sheets

RETRACTABLE VORTEX GENERATOR FOR REDUCING STALL SPEED

FIELD

Embodiments of the present disclosure relate generally to flow over fluid dynamic surfaces. More particularly, embodiments of the present disclosure relate to retractable vortex generators for improving fluid dynamic characteristics of flow over fluid dynamic surfaces.

BACKGROUND

Flow separation generally occurs when a boundary layer travels toward a leading edge of a lifting surface and far enough against an adverse pressure gradient that a speed of the boundary layer relative to the lifting surface falls almost to zero. Fluid flow may become detached from the lifting surface, and instead form eddies and vortices. In aerodynamics, flow separation can often result in increased drag and reduced lift. Flow separation generally deteriorates low speed performance by causing boundary layer separation at high angles of attack. Deteriorated low speed performance in turn increases a "stall speed" of the lifting surface and potentially causes non-optimal flight conditions when the lifting surface is operating at low speeds associated with takeoff and approach to landing.

SUMMARY

A device and methods for low speed performance improvement of a lifting surface assembly are disclosed. At least one vortex generator is coupled to a lifting surface, and the vortex generator is extended through the lifting surface to increase lift. The vortex generator is retracted inside the lifting surface to decrease drag.

A simple hinged drooped leading edge device is combined with retractable vortex generators and is coupled to a lifting surface such as a wing. In cruise configuration, the wing has smooth low drag upper and lower surfaces. In low speed configuration, a leading edge of the wing droops and the vortex generators extend into an airflow. The drooped leading edge increases camber and the extended vortex generators energize the airflow over an upper surface similar to a complex slotted slat system. This action enhances low speed performance at high angles of attack. In this manner, heavy complex leading edge high lift devices that are expensive, maintenance intensive and suffer from performance reducing surface discontinuities are replaced by a simpler, lighter and smoother leading edge device.

In an embodiment, a method improves low speed performance of a lifting surface assembly. At least one vortex generator is coupled to a lifting surface assembly, and the vortex generator is extended through the lifting surface assembly by drooping a hinged leading edge coupled to the lifting surface assembly to increase lift. The vortex generator is retracted inside the lifting surface to decrease drag.

In another embodiment, a retractable vortex generator device comprises a hinged leading edge device coupled to a lifting surface, and at least one vortex generator coupled to a lifting surface. The vortex generator is operable to extend through the lifting surface to increase lift when the hinged leading edge is drooped, and retract inside the lifting surface to decrease drag when the hinged leading edge is raised.

In yet another embodiment, a method for operating a lifting surface assembly provides improved low speed performance. The method causes a fluid to flow over the lifting surface assembly, and droops a leading edge device hinged to a first surface of the lifting surface assembly, from a nominal position to a deflected position. The method further exposes a plurality of retractable vortex generators a distance beyond a fluid dynamic surface of the lifting surface assembly in response to the drooping of the leading edge device. The method further causes a vortex to be generated within the fluid, and varies a magnitude of a droop position of the leading edge device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aerodynamics, fluid dynamics, structures, control surfaces, manufacturing, and other functional aspects of the systems (and the individual operating components of the systems) may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of a practical non-limiting application, namely, a wing leading edge. Embodiments of the disclosure, however, are not limited to such leading edge applications, and the techniques described herein may also be utilized in other fluid dynamic surface applications. For example, embodiments may be applicable to other lift surfaces of an aircraft such as a flap or a tail, a control surface of an aircraft such as an elevator and an aileron, an engine strut, a wind turbine blade, a hydrodynamic surface utilizing liquid (e.g., water) instead of air, a sail boat sail, an engine propeller, a windmill, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
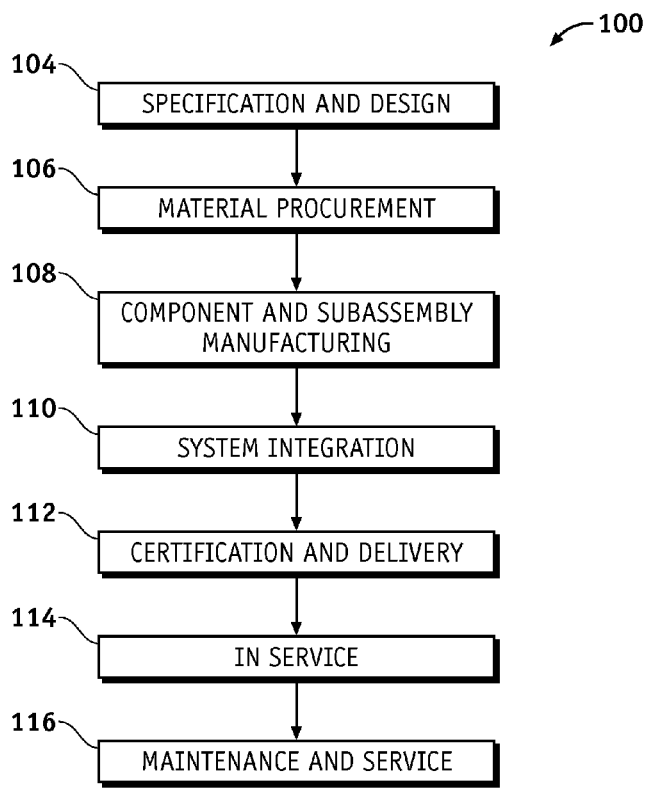
FIG. 1 is an illustration of a flow diagram of an exemplary aircraft production and service methodology.
Figure 2:
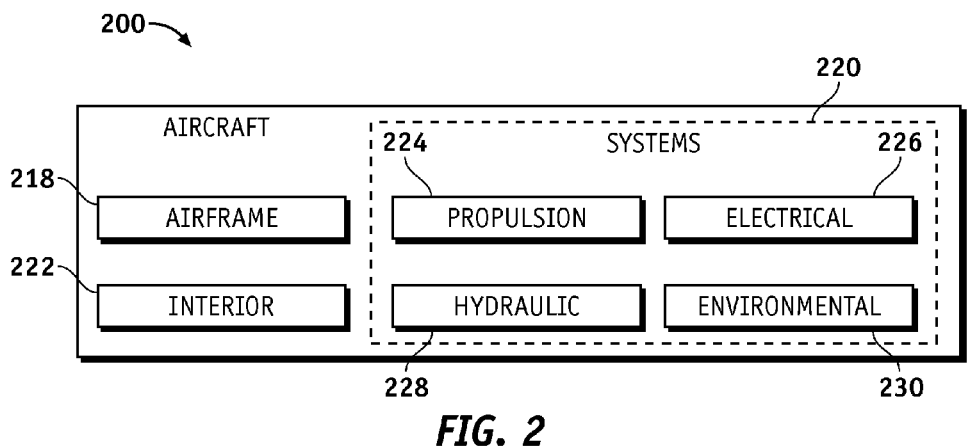
FIG. 2 is an illustration of an exemplary block diagram of an aircraft.

Referring more particularly to the drawings, embodiments of the disclosure may be described in the context of an aircraft manufacturing and service method 100 (method 100) as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, and an environmental system 230. Any number of other systems may also be included. Although an aerospace example is shown, the embodiments of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. In addition, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Embodiments of the disclosure combines benefits of a retractable slotted wing slat with benefits of a fixed vortex generator while eliminating major disadvantages of both. In some embodiments, a simple hinged un-slotted drooped leading edge device is provided that increases a camber of an aerodynamic body such as a wing at low speed configurations, in other embodiments, a slotted leading edge device may be used. Retractable vortex generators (RVGs) may be positioned under a trailing edge of the leading edge device (i.e., slotted or un-slotted leading edge device). In cruise flight, the leading edge device covers the RVGs providing a smooth, low drag wing surface. At low speed the leading edge device rotates on its simple hinge, exposing the RVGs which then extend into a free stream airflow reducing noise.

In this manner, the extended RVGs energize the free stream airflow over an upper surface of the aerodynamic body in a similar manner as a complex slotted slat system. This action enhances low speed performance by delaying boundary layer separation at high angles of attack. However, in contrast to existing complex slotted slat system, embodiments of the disclosure eliminate slat trailing edge overlap in cruise and a leading edge slot in an extended position. Eliminating slat trailing edge overlap in cruise and a leading edge slot in an extended position reduces cruise drag and approach noise. Therefore, heavy complex leading edge high lift devices that are expensive, maintenance intensive, and suffer from performance reducing surface discontinuities are replaced by a simpler, lighter, and smoother leading edge device.

Figure 3:
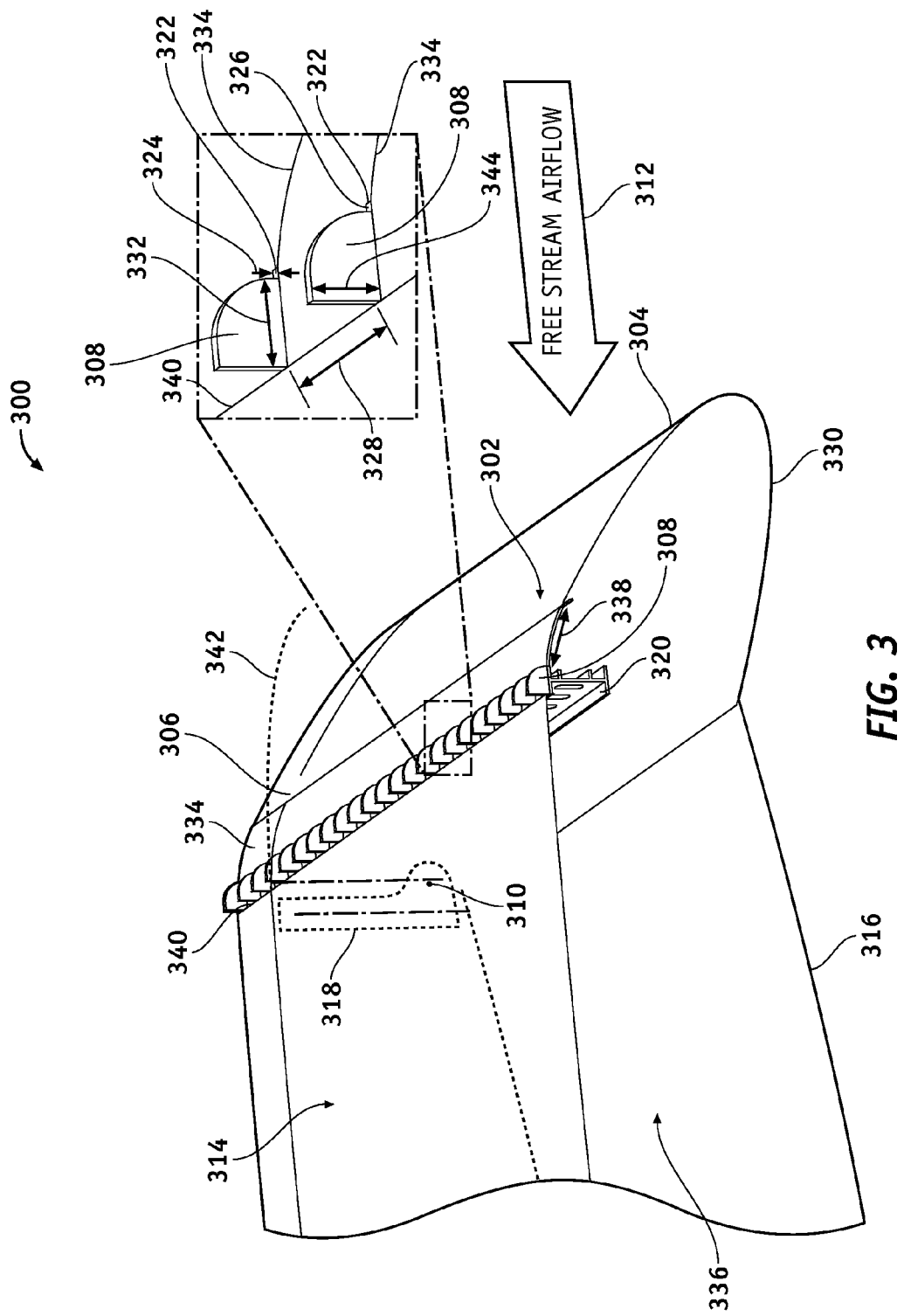
FIG. 3 is an illustration of a perspective view of a lifting surface assembly showing a leading edge droop exposing retractable vortex generators (RVGs) according to an embodiment of the disclosure.

FIG. 3 is an illustration of a perspective view of a lifting surface assembly 300 (e.g., a wing) showing a droop leading edge device 302 (leading edge device 302) exposing a plurality of retractable vortex generators (RVGs) 308 according to an embodiment of the disclosure. The lifting surface assembly 300 may comprise the leading edge device 302, the RVGs 308, a hinge 310, a first surface 314 (upper surface 314) (lifting surface 314), a second surface 316 (lower surface 316), and a hinge actuator mechanism 318.

The lifting surface assembly 300 may comprise, for example but without limitation, an aerodynamic body such as an aircraft wing, an aircraft vertical tail, an aircraft control surface (such as an aircraft elevator, an aircraft aileron, and an aircraft rudder, an airfoil), a lifting surface of a racing car, a ship rudder, a hydrofoil, an engine propeller, a windmill, and the like.

The leading edge device 302 comprises a leading edge 304, a trailing edge 306, and a leading edge lower surface 330. The leading edge device 302 comprises a simple hinged un-slotted drooped leading edge device that increases a camber of the lifting surface assembly 300 at low speed configurations. As mentioned above, in one embodiment the leading edge device 302 comprises a slotted drooped leading edge device that increases a camber of the lifting surface assembly 300 at low speed configurations. The leading edge 304 is a first edge of the leading edge device 302 to encounter a flow medium such as the free stream airflow 312 of air in a case of aircraft, or racing cars, and water in a case of a ship rudder.

The leading edge device 302 is hingeably coupled to the first surface 314 (upper surface 314) via the hinge 310. An aerodynamic surface 334 (fluid dynamic surface 334) may be provided to support the leading edge device 302. The aerodynamic surface 334 acts as an extension of the trailing edge 306 when the leading edge device 302 is drooped, thereby covering a distance 338 between the trailing edge 306 and an edge 340. In the embodiment shown in FIG. 3, the RVGs 308 extend out of slots 322 in a skin of and a distance above the fluid dynamic surface 334 of the lifting surface assembly 300 when the leading edge device 302 is drooped. However, in other embodiments, the RVGs can extend out of slots in a skin of and a distance above other fluid dynamic surfaces of the lifting surface assembly 300. The trailing edge 306 and the edge 340 overlap when the leading edge device 302 is at a fully retracted position (FIG. 5). The leading edge device 302 is operable to droop and be raised using the hinge actuator mechanism 318 as explained in more detail in the context of discussion of FIG. 4 below.

In the embodiment shown in FIG. 3, the RVGs 308 comprise movable vortex generators that may be positioned under the trailing edge 306 of the leading edge device 302. The RVGs 308 are coupled by coupling means 320 to the hinge actuator mechanism 318. In cruise flight, the leading edge device 302 is positioned at nominal position 342, thereby covering the RVGs 308 (FIG. 5) and providing a smooth, low drag surface (upper surface 314) for the lifting surface assembly 300 (e.g., wing). At low speed, as shown in FIG. 3, the leading edge device 302 rotates downward on its hinge 310, exposing the RVGs 308 through slots 322 which then extend into the free stream airflow 312. In this manner, the RVGs 308 through the slots 322 energize the free stream airflow 312 over the upper surface 314 in a similar manner as a complex slotted slat system. This action enhances low speed performance by delaying boundary layer separation at high angles of attack.

The RVGs 308 may comprise various airfoil-type vortex generators, such as but without limitation, co-rotating, counter-rotating, contra-rotating, biplane, and the like. The RVGs 308 can generally be placed in a single row. However, tandem configurations can also be used. In tandem configurations, a second row of the RVGs 308 can be used to re-energize the boundary layer if vortices from a first row have lost their effectiveness. The slots 322 must have a sufficient width 324 to allow a projection of the RVGs 308 therethrough, but the width 324 must not be so great as to create an excessively large gap (not shown) between the RVGs 308 and a slot edge 326 of the slots 322. The RVGs 308 may have, for example but without limitation, spacing 328 of about 1-10 inches, a height 344 of about 0.1-2.5 inches, and a chord of about 0.1-3 inches.

The first surface 314 may be an upper surface and the second surface 316 may be a lower surface if the lifting surface assembly 300 is horizontally oriented such as when the assembly 300 is an aircraft wing, an aircraft elevator, or the lifting surface of a racing car. If the lifting surface assembly 300 is oriented in a vertical manner, however, the first surface 314 and second surface 316 of the may comprise a first lateral surface and a second lateral surface.

The hinge actuator mechanism 318 may be located in a gap 336 inside the lifting surface assembly 300 and coupled to an interior of the lower surface 316 of the leading edge device 302. The hinge actuator mechanism 318 may be at least partially covered and enclosed by the upper surface 314 and the lower surface 316. The hinge actuator mechanism 318 is operable to actuate the leading edge device 302 as explained below.

Figure 4:
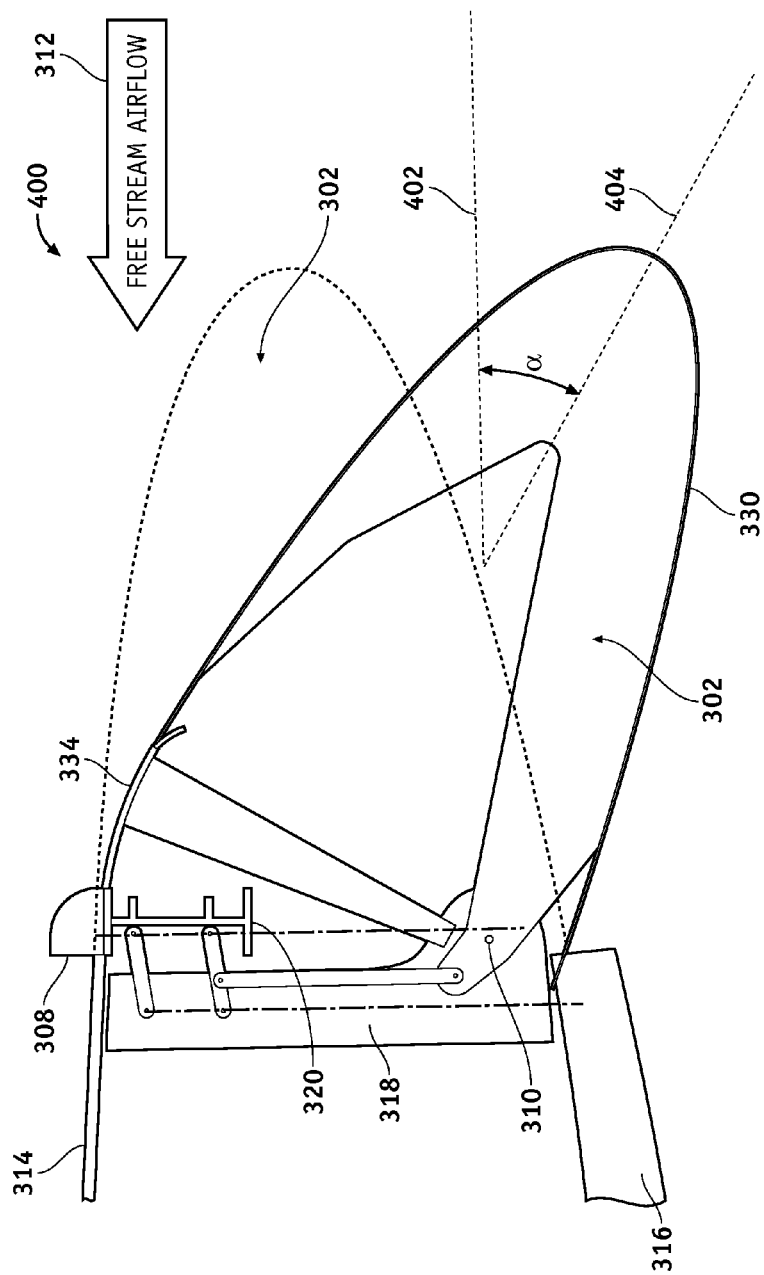
FIG. 4 is an illustration of a side sectional view of a portion of a lifting surface assembly showing a leading edge droop exposing a single RVG according to an embodiment of the disclosure.
Figure 5:
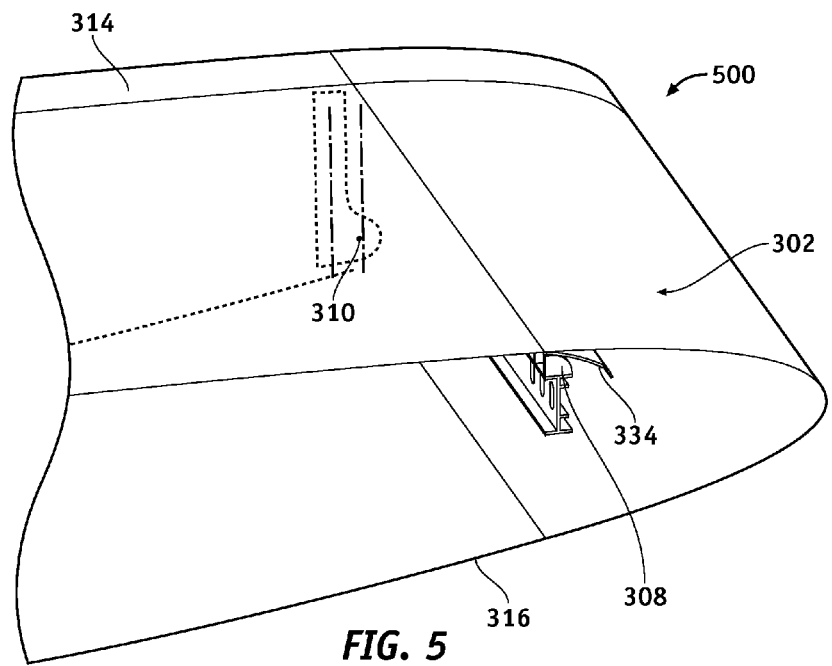
FIG. 5 is an illustration of a perspective view of a lifting surface assembly showing smooth upper and lower leading edge lifting surfaces in a cruise configuration with RVGs hidden under a hinged drooped leading edge according to an embodiment of the disclosure.

FIG. 4 is an illustration of a side sectional view of a portion of a lifting surface assembly 400 showing leading edge droop exposing a single retractable vortex generator (RVG) 308 according to an embodiment of the disclosure. The lifting surface assembly 400 comprises the leading edge device 302, the RVG 308, the hinge 310, the upper surface 314, the lower surface 316, the hinge actuator mechanism 318, the coupling means 320, and the fluid dynamic surface 334. Embodiment shown in FIG. 4 may have functions, material, and structures that are similar to the embodiments shown in FIG. 3. Therefore, common features, functions, and elements may not be redundantly described here.

The hinge actuator mechanism 318 is coupled to the leading edge device 302 and is operable to actuate the leading edge device 302 in an up (raise) or down (droop) direction (if the lifting surface assembly 300-400 is horizontally oriented) or in a side to side direction (if the lifting surface assembly 300-400 is vertically oriented). The hinge actuator mechanism 318 causes the leading edge device 302 to be extended from a nominal position 402 (342 in FIG. 3) into a drooped position 404 (deflected position 404). The leading edge device 302 hingeably rotates around the hinge 310 from the nominal position 402 to the drooped position 404 to expose the RVG 308. In the embodiment shown in FIG. 4, an angle of rotation $\alpha$ of the leading edge device 302 may range, for example but without limitation, from 0-30 degrees, and the like. Any actuation mechanism known in art suitable to extend/retract the leading edge device 302 may be used.

The RVG 308 is substantially covered, when the leading edge device 302 is in the nominal position 402 relative to the lifting surface 314, and the RVG 308 is exposed a variable distance into a boundary layer and able to generate vortices in the boundary layer on a portion of the lifting surface 314 during flight when the RVG 308 is in the deflected position 404 relative to the lifting surface 314.

Hinge coupling the leading edge device 302 to the lifting surface assembly 400 provides the hinged leading edge 302. Therefore in this document, the terms leading edge device 302 and hinged leading edge 302 may be used interchangeably. Also, the hinged leading edge 302 provides an exposed RVG 308 and a covered RVG 308 (FIG. 5) when the hinged leading edge 302 is drooped and raised respectively. Therefore in this document, the terms RVG 308, exposed RVG 308, and covered RVG 308 may be used interchangeably.

In practice, in a low speed flight condition the hinged leading edge 302 rotates on its hinge 310, exposing the RVG 308 to provide the exposed RVG 308 which then extends into the free stream airflow 312, and in a cruise flight condition the hinged leading edge 302 covers the RVG 308 to provide the covered RVG 308 providing a smooth, low drag surface of the lifting surface assembly 400.

FIGS. 5-8 are sequential illustrations of perspective views of the lifting surface assembly 500/600/700/800 showing the leading edge device 302 of the lifting surface assembly 300/400 at various positions according to an embodiment of the disclosure. Embodiments shown in FIGS. 5-8 may have functions, material, and structures that are similar to the embodiments shown in FIGS. 3-4. Therefore common features, functions, and elements may not be redundantly described here.

In practice, the RVGs 308 extend through the lifting surface assembly 300 to increase lift, when the leading edge device 302 is drooped, and the RVGs 308 retract inside the lifting surface assembly 300 to decrease drag, when the hinged leading edge 302 is raised.

FIG. 5 is an illustration of a perspective view of the lifting surface assembly 500 (e.g., wing) showing smooth upper surface 314 and lower surface 316 in cruise configuration with the RVGs 308 hidden under a hinged drooped leading edge such as the leading edge device 302 according to an embodiment of the disclosure.

Figure 6:
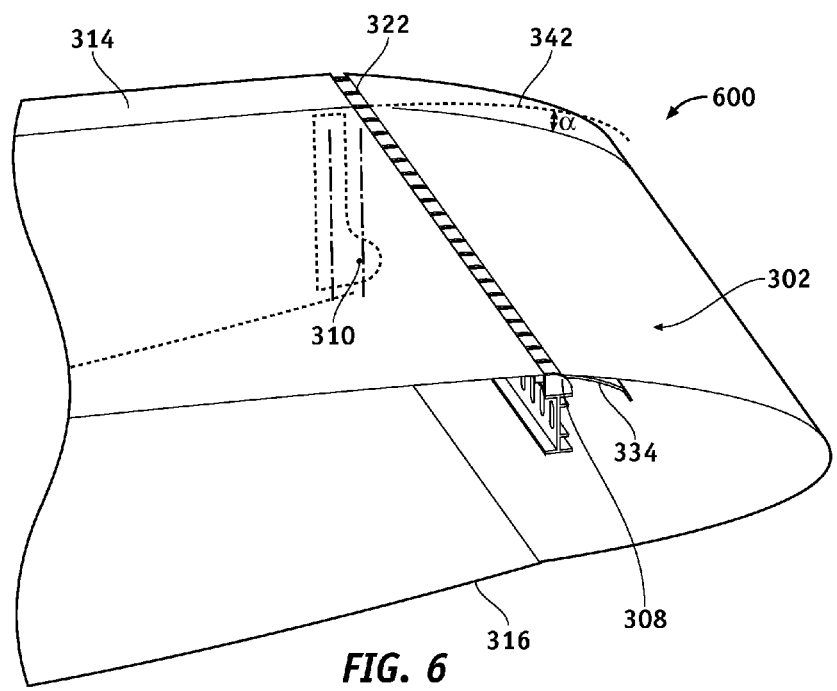
FIG. 6 is an illustration of a perspective view of a lifting surface assembly showing an initial leading edge droop at an angle of about 5 degrees exposing RVGs according to an embodiment of the disclosure.

FIG. 6 is an illustration of a perspective view of a lifting surface assembly 600 showing the leading edge device 302 drooped at an initial angle of rotation α of about 5 degrees exposing the RVGs 308 through the slots 322 according to an embodiment of the disclosure.

Figure 7:
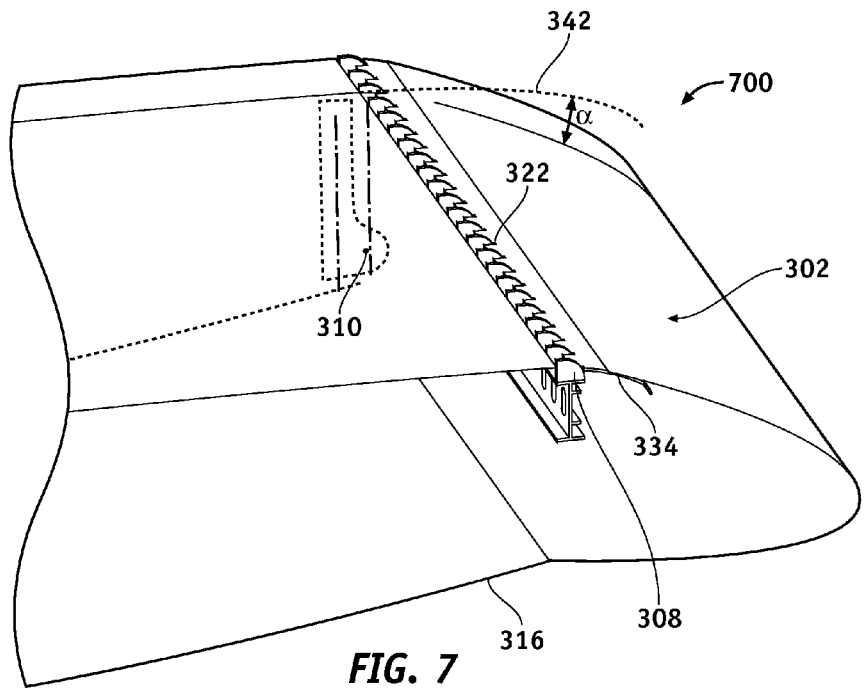
FIG. 7 is an illustration of a perspective view of a lifting surface assembly showing a mid level leading edge droop at an angle of about 15 degrees extending RVGs out of slots in a skin of an aerodynamic surface of the lifting surface assembly according to an embodiment of the disclosure.

FIG. 7 is an illustration of a perspective view of a lifting surface assembly 700 showing the leading edge device 302 drooped at a midlevel angle of rotation α of about 15 degrees extending the RVGs 308 out of the slots 322 in skin of the aerodynamic surface 334 according to an embodiment of the disclosure.

Figure 8:
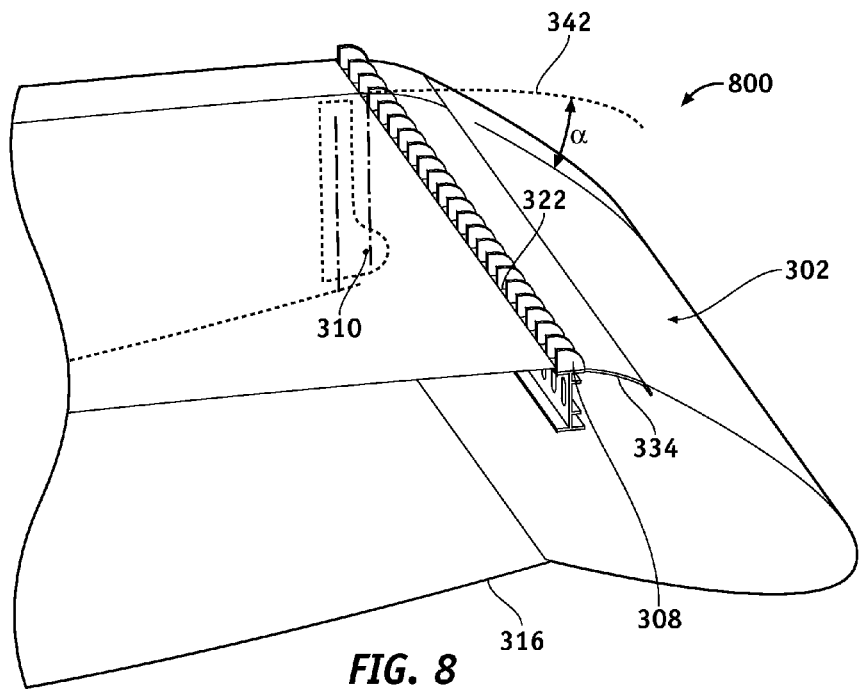
FIG. 8 is an illustration of a perspective view of a lifting surface assembly showing a fully traveled leading edge droop at an angle of about 30 degrees exposing and fully extending RVGs according to an embodiment of the disclosure.

FIG. 8 is an illustration of a perspective view of a lifting surface assembly 800 showing the leading edge device 302 drooped at a fully extended angle of rotation α of about 30 degrees exposing and fully extending the RVGs 308 out of the slots 322 according to an embodiment of the disclosure.

As explained above, FIGS. 5-8 show exemplary deflection/droop of the leading edge device 302 at various angles of rotation α in a range of about 0-30 degrees. However, other angles of rotation α may also be used to expose the RVGs 308.

The leading edge device 302 can be drooped exposing the RVGs 308 for easy maintenance access to an interior of the lifting surface assembly 300/400/500/600/700/800 such as, but without limitation, an interior of a wing, and the like, according to an embodiment of the disclosure. In this manner, complexity is reduced compared to existing solutions such as removable lower panels.

Figure 9:
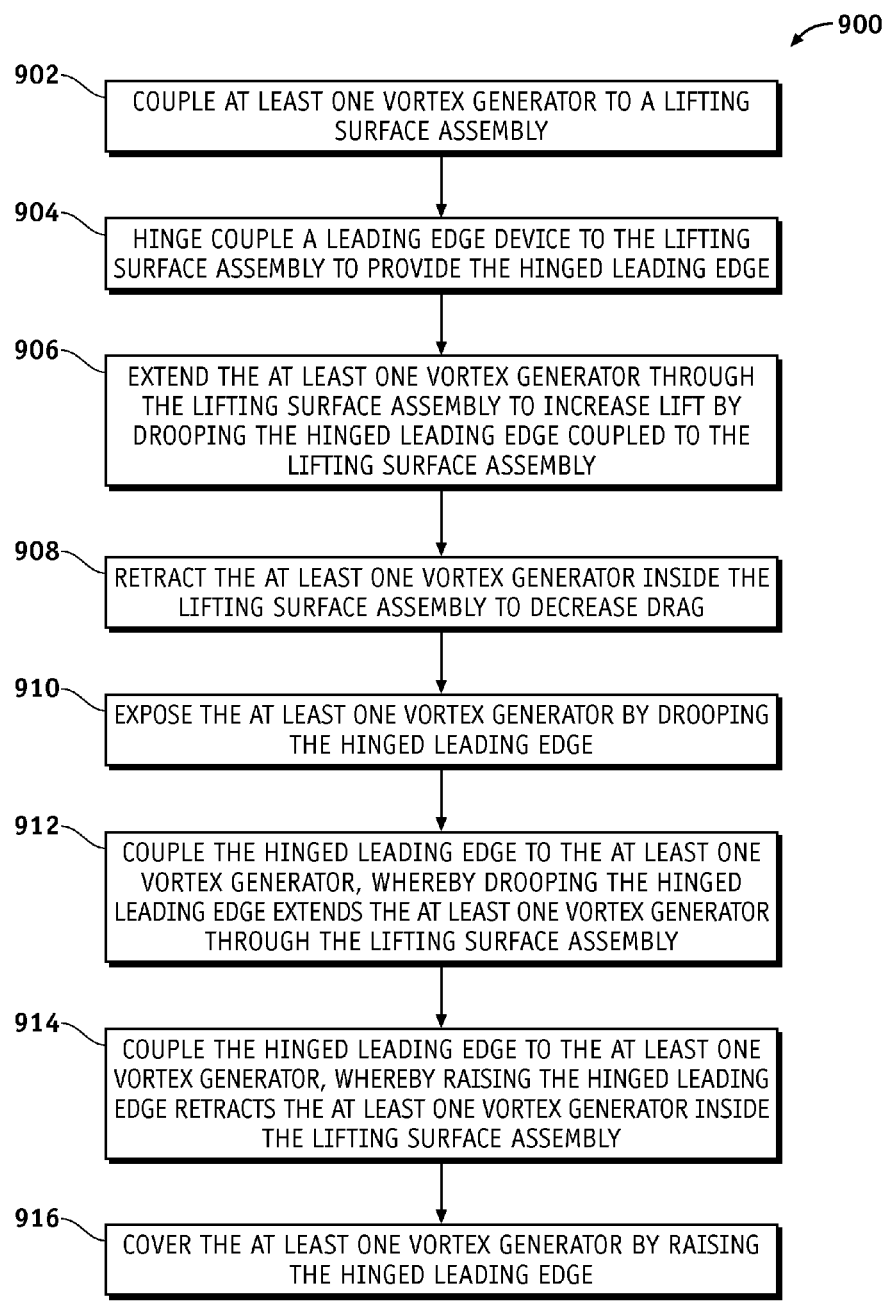
FIG. 9 is an illustration of an exemplary flowchart showing a process for using RVGs to improve low speed performance of a lifting surface assembly according to an embodiment of the disclosure.

FIG. 9 is an illustration of an exemplary flowchart showing a process 900 for improving low speed performance of the lifting surface assembly 300/400/500/600/700/800 by using the RVGs 308 according to an embodiment of the disclosure. The various tasks performed in connection with the process 900 may be performed mechanically, by software, hardware, firmware, or any combination thereof. For illustrative purposes, the following description of the process 900 may refer to elements mentioned above in connection with FIGS. 3-9. In practical embodiments, portions of the process 900 may be performed by the leading edge device 302, the RVGs 308, the hinge 310, the first surface 314, the second surface 316, the hinge actuator mechanism 318, the fluid dynamic surface 334, etc. Process 900 may have functions, material, and structures that are similar to the embodiments shown in FIGS. 3-8. Therefore, common features, functions, and elements may not be redundantly described here.

Process 900 may begin by coupling at least one retractable vortex generator such as the RVG 308 to a lifting surface assembly such as the lifting surface assembly 300 (task 902).

Process 900 may continue by hinge coupling a leading edge device such as the leading edge device 302 to the lifting surface assembly 300 to provide the hinged leading edge 302 (task 904).

Process 900 may continue by extending the RVG 308 through the lifting surface assembly 300 to increase lift by drooping a hinged leading edge such as the hinged leading edge 302 coupled to the lifting surface assembly 300 (task 906).

Process 900 may continue by retracting the RVG 308 inside the lifting surface assembly 300 to decrease drag (task 908).

Process 900 may then continue by exposing the RVG 308 by drooping the hinged leading edge 302 (task 910) to provide an exposed vortex generator 308. In this manner, the exposed vortex generator 308 energizes an airflow over the upper surface 314 of the lifting surface assembly 300, delaying an air flow boundary layer separation at a high angle of attack of the lifting surface assembly 300. The exposed vortex generator 308 provides a lower stall speed for the lifting surface assembly 300.

Process 900 may continue by coupling the hinged leading edge 302 to the RVG 308, whereby drooping the hinged leading edge 302 extends the RVG 308 through the lifting surface assembly 300 (task 912).

Process 900 may continue by coupling the hinged leading edge 302 to the RVG 308, whereby raising the hinged leading edge 302 retracts the RVG 308 inside the lifting surface assembly 300 (task 914).

Process 900 may continue by covering the RVG 308 by raising the hinged leading edge 302 (task 916). In this manner, the covered vortex generator 308 reduces cruise drag.

Figure 10:
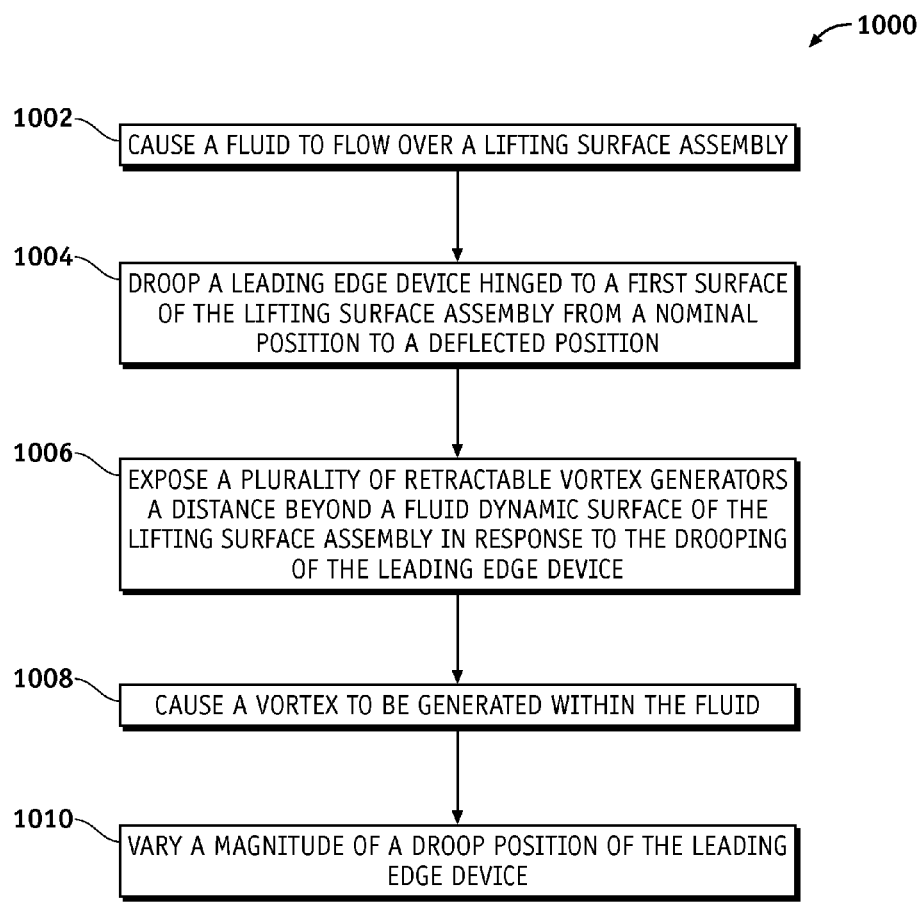
FIG. 10 is an illustration of an exemplary flowchart showing a process for operating a lifting surface assembly to provide improved low speed performance according to an embodiment of the disclosure.

FIG. 10 is an illustration of an exemplary flowchart showing a process for operating a lifting surface assembly to provide improved low speed performance according to an embodiment of the disclosure. The various tasks performed in connection with process 1000 may be performed mechanically, by software, hardware, firmware, or any combination thereof. For illustrative purposes, the following description of process 1000 may refer to elements mentioned above in connection with FIGS. 3-8. In practical embodiments, portions of the process 1000 may be performed by the leading edge device 302, the RVGs 308, the hinge 310, the first surface 314, the second surface 316, the hinge actuator mechanism 318, the fluid dynamic surface 334, etc. Process 1000 may have functions, material, and structures that are similar to the embodiments shown in FIGS. 3-9. Therefore common features, functions, and elements may not be redundantly described here.

Process 1000 may begin by causing a fluid to flow over a lifting surface assembly such as the lifting surface assembly 300 (task 1002). In this manner, the process 1000 may cause the lifting surface assembly 300 to move through the fluid or to cause the fluid to move over the lifting surface assembly 300. In an embodiment in which the lifting surface assembly 300 comprises an aircraft wing or tail or a racing car lifting surface, the medium is air. In a case in which the lifting surface assembly 300 is a ship rudder, the medium is water.

Process 1000 may then continue by drooping (deflecting) a leading edge device such as the leading edge device 302 hinged to a surface such as the first surface 314 of the lifting surface assembly 300 from the nominal position 402 to a deflected/drooped position 404 (task 1004).

Process 1000 may then continue by one or more RVGs such as RVGs 308 extended or exposed a distance (not shown) beyond the fluid dynamic surface 334 of the lifting surface assembly 300 in response to the drooping of the leading edge device 302 (task 1006). In one embodiment, the RVGs 308 can extend or be exposed a distance (not shown) beyond the first surface 314 of the lifting surface assembly 300 in response to the deflecting/drooping.

Process 1000 may then continue by the one or more RVGs cause a vortex to be generated within the fluid (not shown) (task 1008), which is flowing over the lifting surface assembly 300.

Process 1000 may then continue by varying a magnitude/angle of rotation α of a droop position of the leading edge device 302 (task 1010).

The leading edge device 302 at the drooped position increases camber and the extended RVGs 308 energize the airflow over the upper surface 314. In this manner, flow separation is delayed enhancing low speed performance of the lifting surface assembly 300 by retarding a boundary layer separation at high angles of attack. This in turn decreases a "stall speed" and in case of aircraft causes optimal flight conditions when operating at the low speeds and low altitudes associated with, for example, take off, and an approach to landing.

In this way, various embodiments of the disclosure provide a device and methods for reducing "stall speed" of a lifting surface assembly by extending retractable vortex generators through the lifting surface assembly via drooping a hinged leading edge coupled to the lifting surface assembly. In this manner, heavy complex leading edge high lift devices that are expensive, maintenance intensive and suffer from performance reducing surface discontinuities are replaced by a simpler, lighter and smoother leading edge device.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 3-8 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated.

The invention claimed is:

1. A method for low speed performance improvement of a lifting surface assembly, the method comprising:
   extending a leading edge device of a lifting surface assembly from a nominal position to a deflected position;
   extending at least one vortex generator hingeably coupled to the leading edge device through at least one slot in a surface of the lifting surface assembly;
   retracting the at least one vortex generator under the surface in response to moving the leading edge device to the nominal position; and
   covering the at least one vortex generator with the leading edge device in response to moving the leading edge device to the nominal position.

2. The method of claim 1, further comprising:
   exposing the at least one vortex generator by drooping a hinged leading edge, wherein the leading edge device is hingeably coupled to the lifting surface assembly to provide the hinged leading edge.

3. The method of claim 2, further comprising raising the hinged leading edge to retract the at least one vortex generator under the surface.

4. The method of claim 1, further comprising covering the at least one vortex generator and the at least one slot with the hinged leading edge.

5. The method of claim 2, wherein drooping the hinged leading edge increases a camber of the lifting surface assembly.

6. The method of claim 2, wherein drooping the hinged leading edge rotates the hinged leading edge on its hinge to expose the at least one vortex generator.

7. The method of claim 1, wherein:
   the surface comprises an aerodynamic surface coupled to a first surface of the lifting surface assembly, the aerodynamic surface configured to be covered by the leading edge device when the leading edge device is in the nominal position, the aerodynamic surface further configured to span between the leading edge device and the first surface when the leading edge device is in the deflected position;

the extending of the at least one vortex generator comprises extending the at least one vortex generator through the at least one slot in the aerodynamic surface; and the retracting the at least one vortex generator comprises retracting the at least one vortex generator below the aerodynamic surface.

8. The method of claim 1, wherein the at least one vortex generator is positioned under a trailing edge of the leading edge device when the leading edge device is in the nominal position.

9. The method of claim 8, further comprising overlapping an edge of the surface by the trailing edge when the leading edge device is in the nominal position.

10. A retractable vortex generator device comprising:
a leading edge device coupled to a lifting surface;
an aerodynamic surface coupled to the lifting surface and configured to be covered by the leading edge device when the leading edge device is in a nominal position;
at least one vortex generator coupled to the lifting surface, the leading edge device or both, and operable to:
extend through at least one slot in the lifting surface or the aerodynamic surface in response to the leading edge device being drooped; and
retract under the lifting surface or the aerodynamic surface in response to the leading edge device being raised.

11. The retractable vortex generator device of claim 10, wherein the at least one vortex generator is configured to be disposed under a trailing edge of the leading edge device when the leading edge device is in the nominal position.

12. The retractable vortex generator device of claim 10, wherein the at least one vortex generator is hingeably coupled to one or more of the lifting surface, and the leading edge device.

13. The retractable vortex generator device of claim 10, wherein the leading edge device is configured to cover the at least one vortex generator.

14. The retractable vortex generator of claim 10, wherein the leading edge device is configured to increase a camber of the lifting surface when the leading edge device is positioned in a drooped position.

15. The retractable vortex generator of claim 10, wherein the lifting surface comprises at least one member selected from the group consisting of: an aircraft wing, an aircraft control surface, a hydrofoil, and a ship rudder.

16. The retractable vortex generator device of claim 10, wherein the leading edge device is hingeably coupled to the lifting surface.

17. The retractable vortex generator of claim 10, wherein the leading edge device comprises an un-slotted leading edge device.

18. The retractable vortex generator of claim 10, wherein the leading edge device is configured to cover the at least one vortex generator and the at least one slot when the leading edge device is in the nominal position, a trailing edge of the leading edge device overlapping an edge of the surface.

19. A method for operating a lifting surface assembly to provide improved low speed performance, the method comprising:
causing a fluid to flow over the lifting surface assembly;
drooping a leading edge device hingeably coupled to the lifting surface assembly from a nominal position to a deflected position;
exposing a plurality of retractable vortex generators through a plurality of slots in a first surface of the lifting assembly in response to the drooping of the leading edge device, the retractable vortex generators configured to be covered by a trailing edge of the leading edge device when the leading edge device is in the nominal position;
varying a magnitude of a droop position of the leading edge device;
retracting the vortex generators through the slots by moving the leading edge device to the nominal position.

20. The method of claim 19, wherein:
the leading edge device and the at least one vortex generator are coupled together using a hinge actuator mechanism; and
the exposing of the retractable vortex generators and the retracting of the vortex generators comprises operating the hinge actuator mechanism to raise and lower, respectively, the retractable vortex generators above and below the first surface, respectively.

* * * * *